(12) United States Patent
Chen et al.

(10) Patent No.: US 9,575,238 B2
(45) Date of Patent: Feb. 21, 2017

(54) BACK LIGHT MODULE

(71) Applicant: Au Optronics Corporation, Hsinchu (TW)

(72) Inventors: Ming-Lung Chen, Taoyuan County (TW); Ming-Chun Hsu, Miaoli County (TW); Wei-Chun Chung, Keelung (TW)

(73) Assignee: Au Optronics Corporation, Hsinchu (TW)

( * ) Notice: Subject to any disclaimer, the term of this patent is extended or adjusted under 35 U.S.C. 154(b) by 177 days.

(21) Appl. No.: 14/472,399

(22) Filed: Aug. 29, 2014

(65) Prior Publication Data

US 2015/0316705 A1    Nov. 5, 2015

(30) Foreign Application Priority Data

May 5, 2014 (TW) .............................. 103115975 A

(51) Int. Cl.
    *F21V 8/00*      (2006.01)

(52) U.S. Cl.
    CPC ......... *G02B 6/0063* (2013.01); *G02B 6/0036* (2013.01); *G02B 6/0045* (2013.01); *G02B 6/0068* (2013.01); *G02B 6/0088* (2013.01); *G02B 6/0038* (2013.01); *G02B 6/0046* (2013.01); *G02B 6/0061* (2013.01)

(58) Field of Classification Search
CPC ... G02B 6/0045; G02B 6/0068; G02B 6/0088
See application file for complete search history.

(56) References Cited

U.S. PATENT DOCUMENTS

| 6,925,243 B2* | 8/2005 | Lin | ..................... G02B 6/0038 362/339 |
| 8,322,904 B2 | 12/2012 | Lee et al. | |
| 2007/0189039 A1* | 8/2007 | Yokota | ................. G02B 6/0065 362/619 |
| 2009/0103004 A1 | 4/2009 | Su et al. | |

(Continued)

FOREIGN PATENT DOCUMENTS

| CN | 102155676 | 8/2011 |
| KR | 20130077709 | 7/2013 |

(Continued)

*Primary Examiner* — Elmito Breval
(74) *Attorney, Agent, or Firm* — Jianq Chyun IP Office

(57) ABSTRACT

A backlight module including a light guide plate, a plurality of point light sources and a frame is provided. The light guide plate includes a body, a positioning structure and a plurality of first micro-structures. The body has at least one light incident surface, an upper surface connected with the light incident surface, and at least one side surface connected with the light incident surface and the upper surface. The positioning structure is located on the side surface, wherein the upper surface has a first eliminating region adjacent to and surrounding the positioning structure. The first micro-structures are arranged on the upper surface except the first eliminating region. The point light sources face the light incident surface. The light guide plate is positioned in the frame by matching the positioning structure with a positioning component of the frame. A display device including the backlight module aforementioned is also provided.

14 Claims, 11 Drawing Sheets

(56) References Cited

U.S. PATENT DOCUMENTS

| | | | |
|---|---|---|---|
| 2011/0157912 A1* | 6/2011 | Wu ..................... | G02B 6/0043 |
| | | | 362/606 |
| 2011/0164436 A1 | 7/2011 | Lee et al. | |
| 2014/0176816 A1 | 6/2014 | Kasai | |

FOREIGN PATENT DOCUMENTS

| | | | |
|---|---|---|---|
| KR | 1020130077709 | * | 7/2013 |
| TW | M328017 | | 3/2008 |
| TW | 200827781 | | 7/2008 |
| TW | M345244 | | 11/2008 |
| TW | 200919024 | | 5/2009 |
| TW | 201022743 | | 6/2010 |
| TW | M381809 | | 6/2010 |
| TW | 201030440 | | 8/2010 |
| TW | I360001 | | 3/2012 |
| TW | I360689 | | 3/2012 |
| TW | I360696 | | 3/2012 |
| TW | I367354 | | 7/2012 |
| TW | I402545 | | 7/2013 |
| WO | 2013035610 | | 3/2013 |

* cited by examiner

BACK LIGHT MODULE

CROSS-REFERENCE TO RELATED APPLICATION

This application claims the priority benefit of Taiwan application serial no. 103115975, filed on May 5, 2014. The entirety of the above-mentioned patent application is hereby incorporated by reference herein and made a part of this specification.

BACKGROUND OF THE INVENTION

1. Field of the Invention

The invention relates to a light source module, and particularly relates to a back light module and a display device using the back light module.

2. Description of Related Art

As the electronic products are more and more commonly used in recent years, display devices (e.g. liquid crystal display (LCD)), which plays an important role in the electronic products, have become the focus of the designers. A display device includes a display panel and a back light module. Some display panels do not have the light-emitting function, so the back light module is provided at the bottom of this kind of display panels as the light source for the display function.

Meanwhile, the display devices nowadays tend to be designed with a slim border. To meet the requirement of having a slim border, not only the non-display region for configuring the wiring at the periphery in a display panel is required to be slim, the design of the back light module also needs to be adjusted. The light guide plate (LGP) and light source used by the back light module are configured together in an assembling frame. In addition, a supporting pin or supporting block is usually arranged between the light guide plate and the assembling frame, so as to provide support and position the light guide plate in the frame. Therefore, the shape of the periphery of the light guide plate needs to correspond to the supporting structure aforementioned. For example, a recess part arranged at the periphery of the light guide plate needs to match the supporting structure, so as to provide the function above. However, when the back light module using the light guide plate emits light, light-jetting effect commonly occurs around the periphery of the recess part of the light guide plate of the back light module. Namely, the light emitted by the back light module through the light guide plate is easily interfered by the recess part. Therefore, the light is not evenly emitted at the recess part. As a result, the back light module does not provide a preferable light-emitting effect, and the display device using the back light module tends to have the defect of mura, which influences the display effect of the display device.

SUMMARY OF THE INVENTION

The invention provides a back light module having an even light-emitting effect.

The invention provides a display device having an even display effect.

The back light module of the invention includes a light guide plate, a plurality of point light sources, and a frame. The light guide plate includes a body, a positioning structure, and a plurality of first micro-structures. The body has at least one light incident surface, an upper surface, and at least one side surface. The light incident surface is connected to the upper surface, and the side surface is connected to the light incident surface and the upper surface. The positioning structure is located at the side surface. In addition, the upper surface has a first eliminating region adjacent to and surrounding the positioning structure. The first micro-structures extend along a first axial direction and are arranged in parallel on the upper surface except the first eliminating region. The point light sources are arranged at one side of the light guide plate and face the light incident surface, wherein the point light sources are adapted to emit light toward the light guide plate, and the light emitted by the point light sources enters the light guide plate from the light incident surface to be emitted from the upper surface. The light guide plate is arranged on the frame, the frame has a positioning component, and the light guide plate is positioned in the frame by matching the positioning structure with the positioning component.

The display device of the invention includes the back light module aforementioned and a display panel. The display panel is arranged on the back light module and faces the upper surface. The display panel has a display region and a non-display region surrounding the display region, the first eliminating region corresponds to the periphery of the display panel, and an area of an orthogonal projection of the first eliminating region on the non-display region is smaller than an area of the orthogonal projection of the first eliminating region on the display region.

According to an embodiment of the invention, the body further includes a lower surface opposite to the upper surface and connected to the light incident surface and the side surface, and the light guide plate further includes a plurality of second micro-structures arranged on the lower surface. The first micro-structures includes a plurality of strip-shaped micro-structures extending along the first axial direction, and the first axial direction is perpendicular to the light incident surface. Moreover, the second micro-structures include a plurality of point-shaped micro-structures distributed on the lower surface.

According to an embodiment of the invention, the second micro-structures are disposed on the entire lower surface.

According to an embodiment of the invention, the lower surface has a second eliminating region adjacent to and surrounding the positioning structure, and the second micro-structures are arranged on the lower surface except the second eliminating region.

According to an embodiment of the invention, an area of the second eliminating region is smaller than an area of the first eliminating region.

According to an embodiment of the invention, the positioning structure includes a positioning recess part located on the side surface and penetrating through the upper surface and the lower surface.

According to an embodiment of the invention, there is an edge between the positioning recess part and the first eliminating region, and the edge has a first reference point. The first reference point is the center point or a break point of the edge, and a distance from the first reference point to a plane where the side surface is located is longer than a distance from other parts of the edge to the plane.

According to an embodiment of the invention, the first eliminating region has a first distance from the first reference point to the adjacent first micro-structure along an axial direction perpendicular to the first axial direction, and the first distance is between 10 mm and 50 mm.

According to an embodiment of the invention, the first eliminating region has a second distance and a third distance respectively from the first reference point to the adjacent first micro-structure along two axial directions having an included angle of 45 degrees with respect to the first axial direction, and the second distance and the third distance are respectively between 14 mm and 70 mm.

According to an embodiment of the invention, the first eliminating region has a second reference point at a position that is 5 mm before the adjacent first micro-structure in an axial direction perpendicular to the first axial direction from the first reference point. The first eliminating region has a fourth distance from the second reference point to the adjacent first micro-structure along the first axial direction, the fourth distance is at least 1 mm.

According to an embodiment of the invention, the first eliminating region has a fifth distance from the first reference point to the adjacent first micro-structure along the first axial direction, and the fifth-distance is at least 5 mm.

According to an embodiment of the invention, the upper surface has a first region and a second region between the first region and the first eliminating region. The first micro-structures in the first region have the same height. Heights of the first micro-structures in the second region are lower than the heights of the first micro-structures in the first region, and gradually decrease in a direction toward the first eliminating region.

According to an embodiment of the invention, a top part of each of the first micro-structures away from the upper surface is coplanar with a part of the upper surface corresponding to the first eliminating region.

According to an embodiment of the invention, there is a sixth distance from a boundary between the second region and the first region to another boundary between the second region and the first eliminating region in an axial direction perpendicular to the first axial direction, and the sixth distance is between 5 mm and 50 mm.

According to an embodiment of the invention, the first micro-structures in the first region have a first height average, and the first micro-structures in the second region have a second height average, and a ratio between the second height average and the first height average is between 0.1 and 0.8.

According to an embodiment of the invention, a boundary between the first eliminating region and the first micro-structures is a wave-shaped curved line. The wave-shaped curved line has at least one wave peak and at least one wave trough, and the wave-shaped curved line has a minimal distance at the wave peak relative to the side surface and a maximal distance at the wave trough relative to the side surface. A difference between the minimal distance and the maximal distance ranging between 1 mm and 40 mm.

Based on the above, the back light module provided in the invention has the first micro-structures and the first eliminating region arranged on the upper surface of the body. In addition, the first eliminating region is adjacent to and surrounds the positioning structure located on the side surface of the body, and the first micro-structures are arranged in parallel on the upper surface except the first eliminating region. In other words, the first eliminating region is the only region on the upper surface of the body that the first micro-structures are not arranged. Thus, when the light guide plate is used with the point light sources facing to the light incident surface, and guides the light to be emitted from the upper surface by using the first micro-structures, the first eliminating region eliminates light-jetting effect around the positioning structure. Also, the display device that uses the back light module avoids the defect of mura due to light jetting effect of the back light module at the positioning structure. Accordingly, the back light module of the invention has an even light-emitting effect. In addition, the display device provided in the invention has an even display effect.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
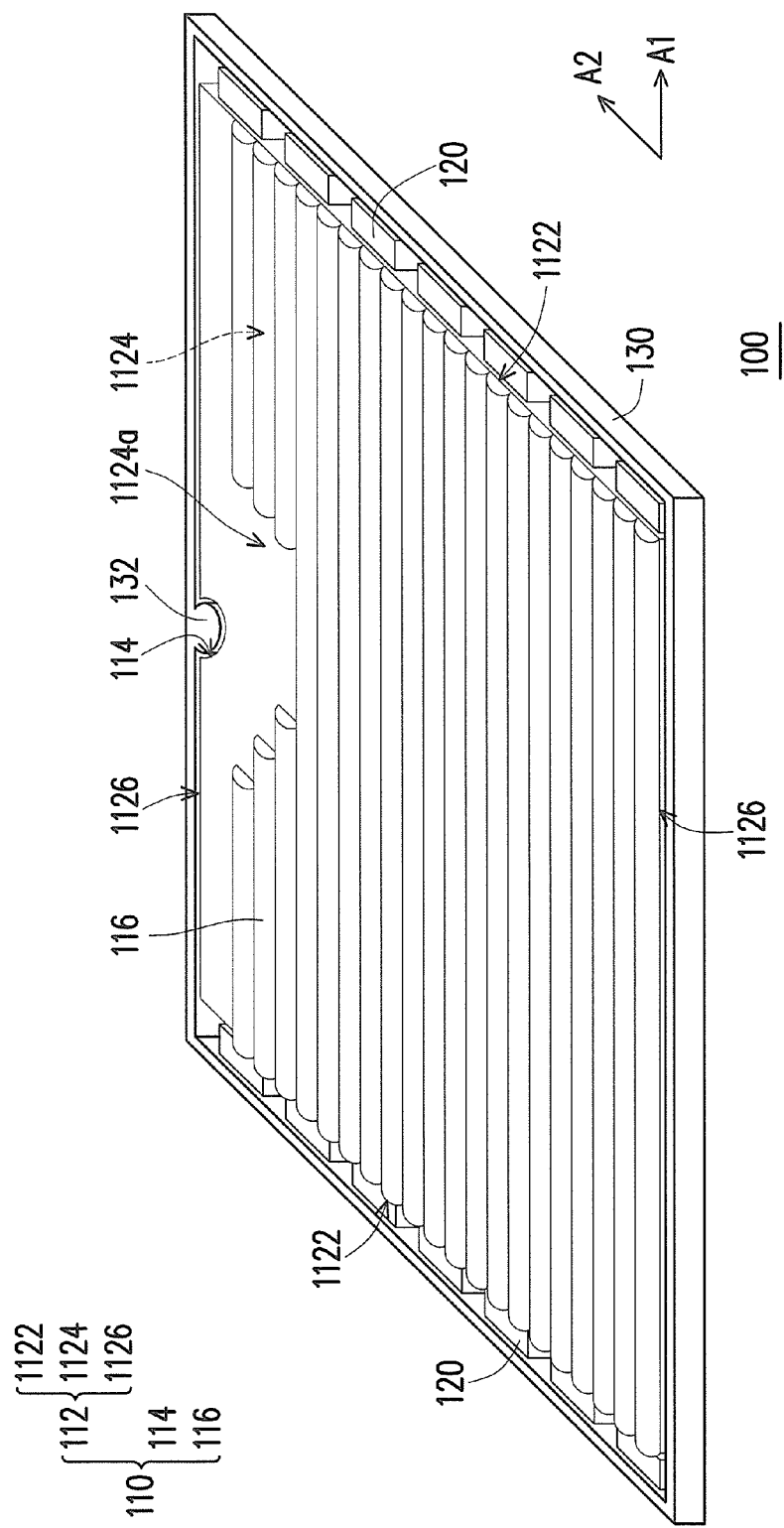
FIG. 1 is a schematic view illustrating a back light module according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
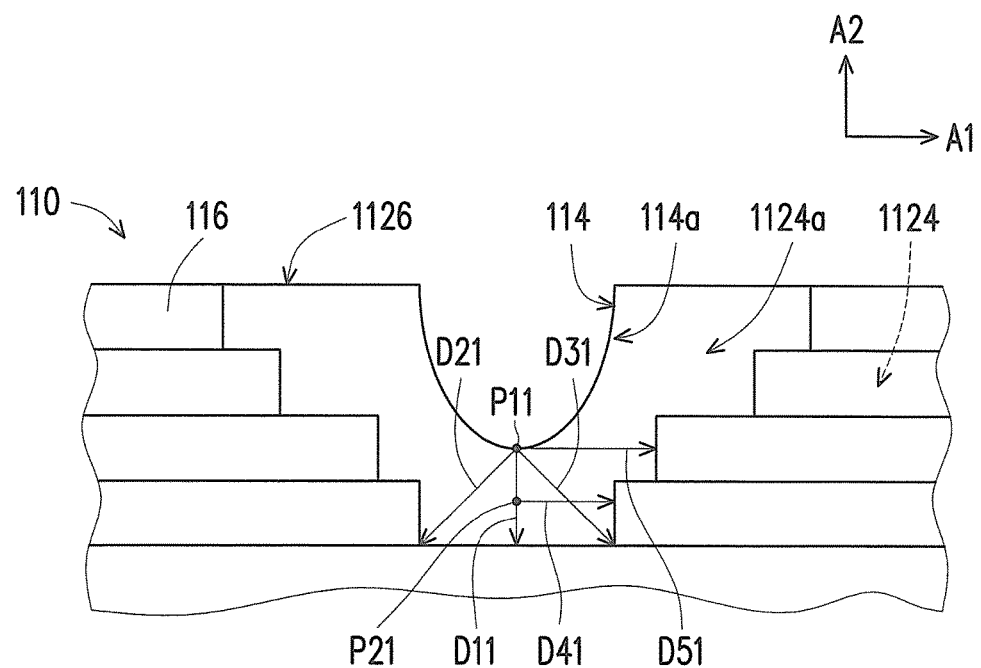
FIG. 2 is a partial schematic top view of the light guide plate of FIG. 1.

FIG. 1 is a schematic view illustrating a back light module according to an embodiment of the invention. FIG. 2 is a partial schematic top view of the light guide plate of FIG. 1. Referring to FIGS. 1 and 2, in this embodiment, a back light module 100 includes a light guide plate 110, a plurality of point light sources 120, and a frame 130. In addition, the light guide plate 110 and the point light sources 120 are arranged on the frame 130. The light guide plate 110 includes a body 112, a positioning structure 114, and a plurality of first micro-structures 116. The body 112 has two light incident surfaces 1122, an upper surface 1124, two side surfaces 1126, and a lower surface 1128 (shown in FIG. 4A). The two light incident surfaces 1122 are opposite to each other and connected to the upper surface 1124. The two side surfaces 1126 are opposite to each other and connected to the incident surfaces 1122 and the upper surface 1124. The lower surface 1128 is opposite to the upper surface 1124 and connected to the incident surfaces 1122 and the side surfaces 1126. The point light sources 120 are arranged at opposite sides of the light guide plate 110 and respectively face the incident surfaces 1122. In addition, the point light sources 120 are suitable to emit light toward the light guide plate 110. The light emitted from the point light sources 120 enters the light guide plate 110 from the light incident surfaces 1122 and is emitted from the upper surface 1124. The point light sources 120 are light emitting diodes (LEDs) or other suitable point light sources, for example. Line light sources such as cold cathode fluorescent lamps (CCFL) may be used in the back light modules of other embodiments as the light source. The invention is not limited thereto.

In this embodiment, the positioning structure 114 of the light guide plate 110 is located on one of the side surfaces 1126, and the frame 130 has a positioning component 132. Therefore, the light guide plate 110 may be positioned in the frame 130 by matching the positioning structure 114 with the positioning component 132. The positioning structure 114 of this embodiment is, for example, a positioning recess part located on one of the side surfaces 1126 and penetrating through the upper surface 1124 and the lower surface 1128. Here, the positioning component 132 may be a positioning pillar that corresponds to the positioning recess part being used as the positioning structure 114. However, in other embodiments, the positioning structure may be a positioning convex part, and the positioning component may be a positioning opening, such that the positioning convex part may penetrate through the positioning opening to position the light guide plate in the frame. Therefore, it can be known that the invention does not intend to limit the types of the positioning structure and the positioning component.

Referring to FIGS. 1 and 2, in this embodiment, the upper surface 1124 of the body 112 has a first eliminating region 1124a. The first eliminating region 1124a is adjacent to and surrounds the positioning structure 114. The first micro-structures 116 extend along a first axial direction A1 and are arranged in parallel on the upper surface 1124 except the first eliminating region 1124a. In other words, the first eliminating region 1124a is the only region on the upper surface 1124 of the body 112 that the first micro-structures 116 are not arranged. Thus, when the point light sources 120 provide light to the light guide plate 110, the first micro-structures 116 arranged on the upper surface 1124 may guide the light to be emitted from the upper surface 1124, and the strip-shaped first micro-structures 116 may be used with the point light sources 120 to control a light-emitting region of the back light module 100. For example, when only some of the point light sources 120 of the back light module 100 emit light, the light of the point light sources 120 is guided by the first micro-structures 116 that extend along the first axial direction A1 to be emitted from a part of the upper surface 1124. In this way, the first micro-structures 116 allow the light emitted from the upper surface 1124 to be directional. At this time, since the first micro-structures 116 are not arranged in the first eliminating region 1124, light-jetting effect around the positioning structure 114 may be effectively prevented. In other words, in the invention, the first eliminating region 1124a without the first micro-structures 116 is arranged at a position adjacent to the positioning structure 114 and on the upper surface 1124, so as to prevents light jetting effect that occurs when the light is guided by the first micro-structures 116 to be emitted from the first eliminating region 1124a and is thus interfered by the positioning structure 114. Accordingly, the back light module 100 of this embodiment has an even light emitting effect.

Specifically speaking, as shown in FIG. 2, the first micro-structures 116 in the embodiment are a plurality of strip-shaped micro-structures, for example. The strip-shaped micro-structures are in a straight-line configuration and extend along the first axial direction A1. In addition, the first axial direction A1 is perpendicular to the light incident surfaces 1122. In other words, the light incident surfaces 1122 may be considered as parallel to a second axial direction A2, and the second axial direction A2 is perpendicular to the first axial direction A1. In addition, the side surfaces 1126 are parallel to the second axial direction A2 and perpendicular to the light incident surfaces 1122. However, the invention is not limited thereto. In this embodiment, there is an edge 114a between the positioning recess part being used as the positioning structure 114 and the first eliminating region 1124a, and the edge 114a has a first reference point P11. The edge 114a may be considered as a common boundary between the positioning structure 114 and the first eliminating region 1124a. The edge 114a of this embodiment is a smooth curve that is recessed toward a central region of the body 112. The first reference point P11 is the center point of the edge 114a. In addition, a distance from the first reference point P11 to a plane where the side surface 1126 is located is longer than a distance from other parts of the edge 114a to the plane. In other words, the first reference point P11 may be considered as the lowest point of the inwardly recessed edge 114a and at the center of the edge 114a. In addition, in this embodiment, the first eliminating region 1124a has a second reference point P21 at a position that is 5 mm before the adjacent first micro-structure 116 in the second axial direction A2 perpendicular to the first axial direction A1 from the first reference point P11. The second reference point P21 is located in the first eliminating region 1124a and is 5 mm before the adjacent first micro-structure 116 in the second axial direction A2. Accordingly, based on the conditions that define the first reference point P11 and the second reference point P21, a condition to arrange the first eliminating region 1124a of this embodiment may be defined based on the first reference point P11 and the second reference point P21.

In this embodiment, the first eliminating region 1124a has a first distance D11 from the first reference point P11 to the adjacent first micro-structure 116 along the second axial direction A2 perpendicular to the first axial direction A1, and the first distance D11 is between 10 mm and 50 mm. In other words, the second reference point P21 located in the first eliminating region 1124a and 5 mm before the adjacent first micro-structure 116 does not contact the first micro-structures 116. In addition, the first eliminating region 1124a has a second distance D21 and a third distance D31 respectively from the first reference point P11 to the adjacent first micro-structure 116 along two axial directions (shown by the arrows in FIG. 2) respectively having an included angle of 45 degrees with respect to the first axial direction A1. The second distance D21 and the third distance D31 are respectively between 14 mm to 70 mm. Furthermore, the first eliminating region 1124a has a fourth distance D41 from the second reference point P21 to the adjacent first micro-structure 116 along the first axial direction A1, and the first eliminating region 1124a has a fifth distance D51 from the first reference point P11 to the adjacent first micro-structure 116 along the first axial direction A1. In addition, the fourth distance D41 is at least 1 mm, and the fifth distance D51 is at least 5 mm. Therefore, it can be known that the first eliminating region 1124a has an appropriate size in a plurality of directions to form a ring-shaped region surrounding the positioning structure 114. Accordingly, the positioning structure 114 is kept away from the first micro-structures 116 in an appropriate distance, so as to effectively reduce light-jetting effect of the back light module 100 occurred at the positioning structure 114.

Figure 3:
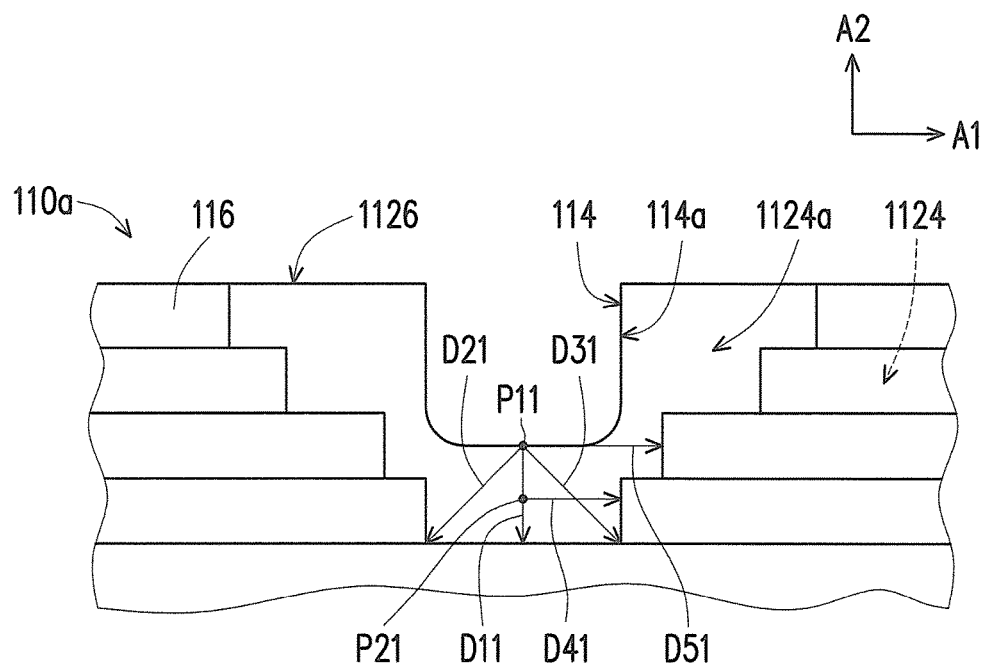
FIG. 3 is a partial schematic top view of a light guide plate according to another embodiment of the invention.

FIG. 3 is a partial schematic top view of a light guide plate according to another embodiment of the invention. Referring to FIGS. 1-3, in this embodiment, the structure and function of a light guide plate 110a shown in FIG. 3 are similar to those of the light guide plate 110. However, the light guide plate 110a mainly differs from the light guide plate 110 in that an edge 114a between the positioning structure 114 and the first eliminating region 1124a of the light guide plate 110a is U-shaped, which is formed of two straight lines parallel to the second axial direction A2 and a horizontal line parallel to the first axial direction A1. Also, the straight and horizontal lines are connected by curved lines. Here, a distance from the horizontal line to the plane where the side surface 1126 is located is greater than the distance from other parts of the edge 114a to the plane. Namely, every point on the horizontal line may be considered as the lowest point of the U-shaped edge 114a. Thus, defining the first reference point P11 as the center point of the edge 114a still meets the condition of "a distance from the first reference point P11 to the plane that the side surface 1126 is located on is greater than the distance from other parts of the edge 114a to the plane", as previously defined. Therefore, it can be known that the invention does not intend to limit the pattern of the edge between the positioning structure and the first eliminating region. The shape may be adjusted based on the needs in practice.

Figure 4A:
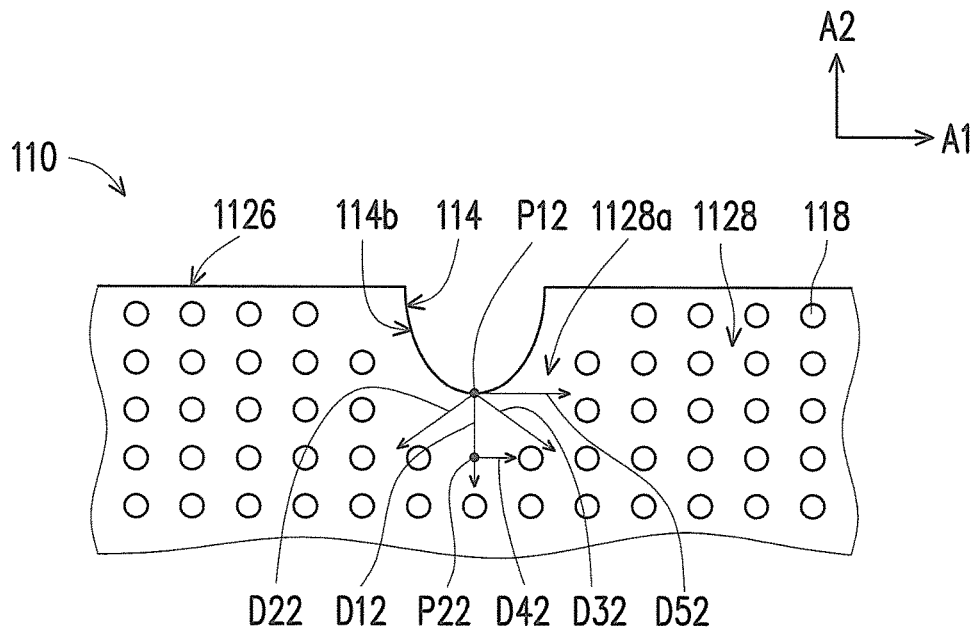
FIG. 4A is a partial schematic bottom view of the light guide plate of FIG. 1.

FIG. 4A is a partial schematic bottom view of the light guide plate of FIG. 1. Referring to FIG. 1 and FIG. 4A, in this embodiment, the light guide plate 110 further includes a plurality of second micro-structures 118 arranged on the lower surface 1128 of the body 112. In addition, the second micro-structures 118 are different from the first micro-structures 116. As described above, the first micro-structures 116 of this embodiment are strip-shaped micro-structures extending along the first axial direction A1 and parallel to each other. As such, the second micro-structures 118 of this embodiment may be a plurality of point-shaped micro-structures. In addition, the point-shaped second micro-structures 118 are distributed on the lower surface 1128. Thus, when the point light sources 120 emit light to the light guide plate 110, the second micro-structures 118 may guide the light that is refracted from the light incident surfaces 1122 toward the lower surface 1128 to the upper surface 1124, such that the light is emitted from the upper surface 1124. In other words, the second micro-structures 118 of this embodiment guides the light to the upper surface 1124, while the first micro-structures 116 controls the light to be emitted from a part of the upper surface 1124. Similarly, the lower surface 1128 of this embodiment has a second eliminating region 1128a. The second eliminating area 1128a is adjacent to and surrounds the positioning structure 114. In addition, the second micro-structures 118 are arranged on the lower surface 1128 except the second eliminating region 1128a. In other words, the second eliminating region 1128a is the only region on the lower surface 1128 of the body 112 that the second micro-structures 118 are not arranged. With the configuration, light-jetting effect around the position structure 114 may be effectively eliminated. Besides, in this embodiment, an area of the second eliminating region 1128a is smaller than an area of the first eliminating region 1124a. In addition, an orthogonal projection of the second eliminating region 1128a on the body 112 is located within an orthogonal projection of the first eliminating region 1124a on the body 112. Accordingly, bright and dark patterns with clear differences around the positioning structure 114 of the back light module 100 may be avoided.

In this embodiment, a definition of the second eliminating region 1128a is similar to the definition of the first eliminating region 1124a. Specifically speaking, there is an edge 114b between the positioning structure 114 and the second eliminating region 1128a, and the edge 114b has a first reference point P12. The edge 114b may be considered as a common boundary between the positioning structure 114 and the second eliminating region 1128a. In addition, the edge 114b and the edge 114a are in the same pattern. The first reference point P12 is the center point of the edge 114b. In addition, a distance from the first reference point P12 to the plane where the side surface 1126 is located is greater than a distance from other parts of the edge 114b to the plane. In addition, the second eliminating region 1128a has a second reference point P22 at a position that is 5 mm before the adjacent second micro-structure 118 in the second axial direction A2 from the first reference point P12. The second reference point P22 is located within the second eliminating region 1128a and does not contact the second micro-structures 118. Accordingly, based on the conditions that define the first reference point P12 and the second reference point P22, a condition to arrange the second eliminating region 1128a of this embodiment may be defined based on the first reference point P12 and the second reference point P22.

Specifically, in this embodiment, the second eliminating region 1128a has a first distance D12 from the first reference point P12 to the adjacent second micro-structure 118 along the second axial direction A2. In addition, the first distance D12 is smaller than the first distance D11 of the first eliminating region 1124a. In addition, the second eliminating region 1128a has a second distance D22 and a third distance D32 respectively from the first reference point P12 to the adjacent second micro-structure 118 along two axial directions (shown by the arrows in FIG. 4A) respectively having an included angle of 45 degrees with respect to the first axial direction A1. In addition, the second distance D22 is smaller than the second distance D21 of the first eliminating region 1124a, and the third distance D32 is smaller than the third distance D31 of the first eliminating region 1124a. Furthermore, the second eliminating region 1128a has a fourth distance D42 from the second reference point P22 to the adjacent second micro-structure 118 along the first axial direction A1, and the second eliminating region 1128a has a fifth distance D52 from the first reference point P12 to the adjacent second micro-structure 118 along the first axial direction A1. In addition, the fourth distance D42 is smaller than the fourth distance D41 of the first eliminating region 1124a, and the fifth distance D52 is smaller than the fifth distance D51 of the first eliminating region 1124a. Accordingly, the second eliminating region 1128a has an appropriate size in a plurality of directions to surround the positioning structure 114, so as to keep an appropriate distance between the positioning structure 114 and the second micro-structures 118. Thus, light-jetting effect of the back light module 100 occurred at the positioning structure 114 may be effectively reduced.

Figure 4B:
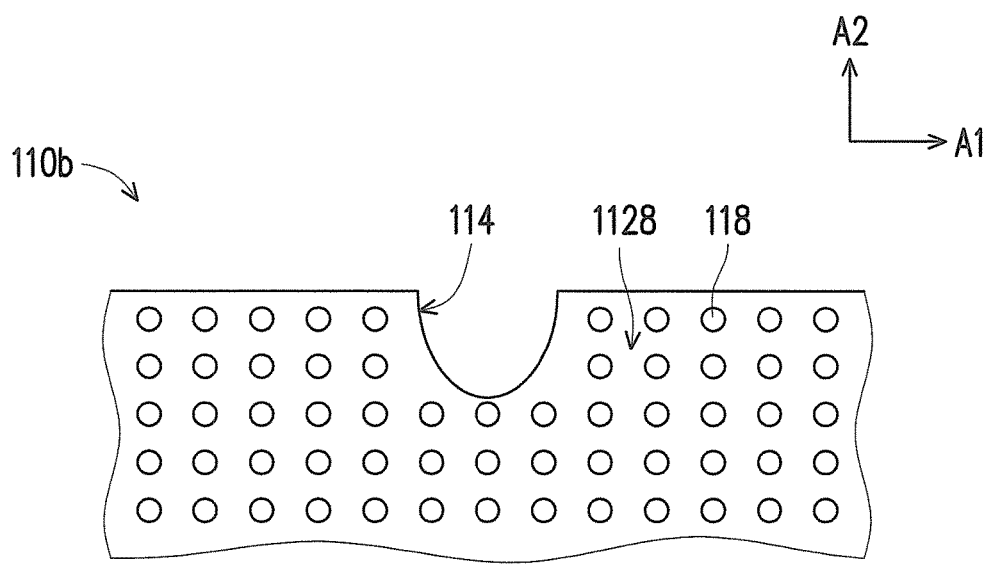
FIG. 4B is a partial schematic bottom view of a light guide plate according to another embodiment of the invention.

However, in other embodiments, the second eliminating region 1128a on the lower surface 1128 of the body 112 may be omitted. For example, referring to FIG. 4B, wherein FIG. 4B is a partial schematic bottom view of a light guide plate according to another embodiment of the invention. In this embodiment, the structure and function of a light guide plate 110b of FIG. 4B are similar to the structure and function of the light guide plate 110. However, the main difference lies in that the light guide plate 110b does not have the second eliminating region 1128a. In other words, the second micro-structures 118 of this embodiment are arranged on the entire lower surface 1128 in this embodiment. It can be known that the invention does not limit whether the second eliminating region 1128a is arranged or not. The designer may make an adjustment in this regard based on the needs in practice.

Figure 5:
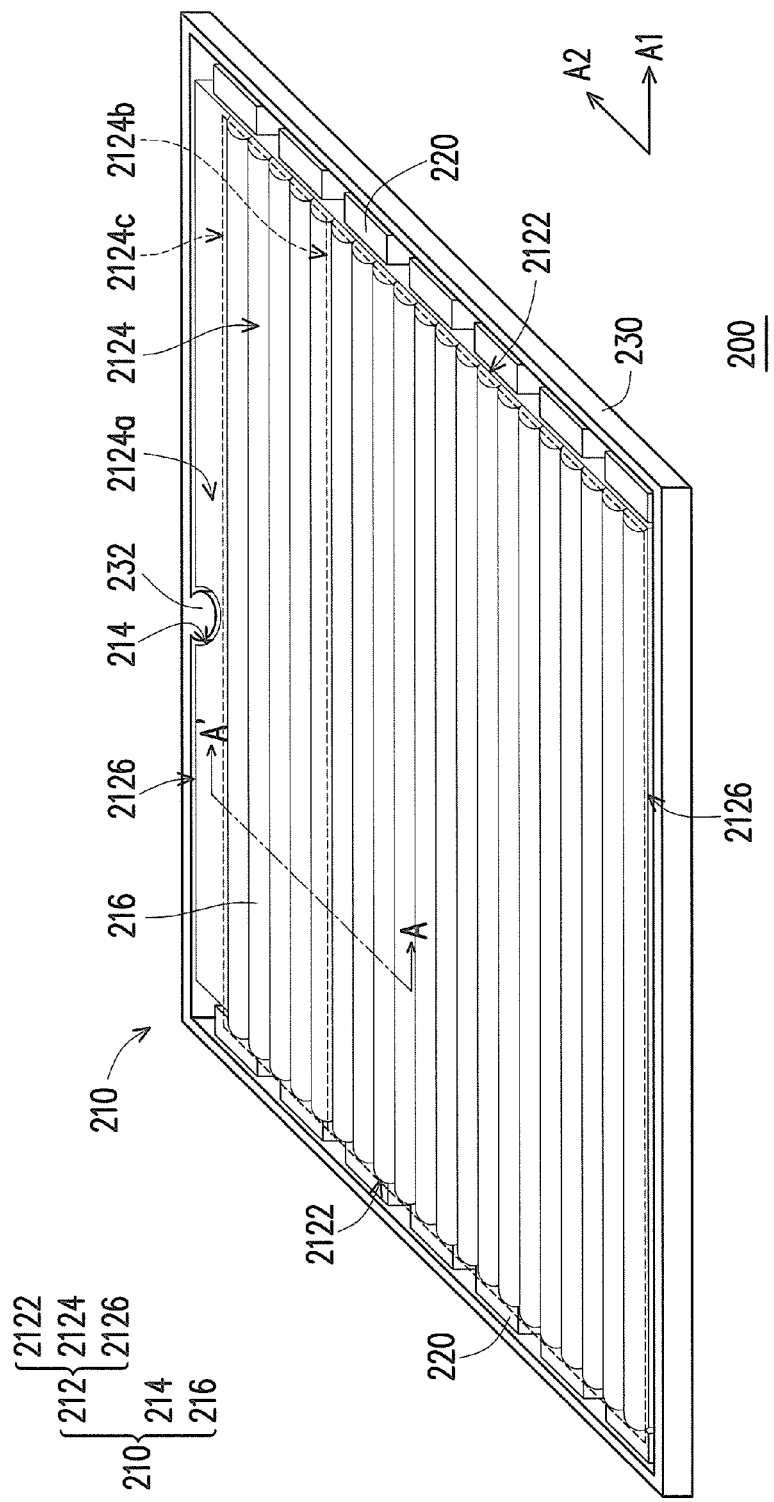
FIG. 5 is a schematic view illustrating a back light module according to still another embodiment of the invention.
Figure 6:
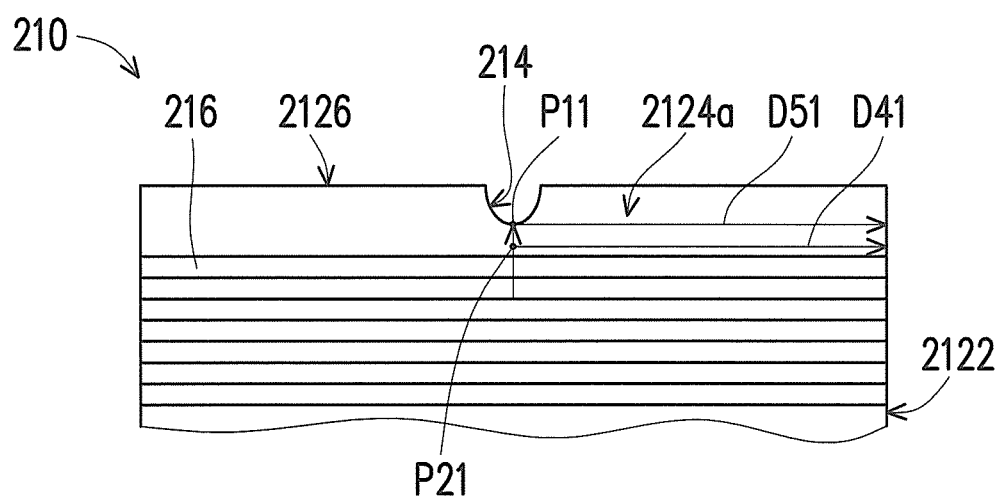
FIG. 6 is a partial schematic top view of the light guide plate of FIG. 5.

FIG. 5 is a schematic view illustrating a back light module according to still another embodiment of the invention. FIG. 6 is a partial schematic top view of the light guide plate of FIG. 5. Referring to FIGS. 5 and 6, in this embodiment, a back light module 200 includes a light guide plate 210, a plurality of point light sources 220, and a frame 230. The structures and functions of the point light sources 220 and the frame 230 may be referred to the point light sources 120 and the frame 130. Therefore, no further details in this respect will be described below. The light guide plate 210 includes a body 212, a positioning structure 214, and a plurality of first micro-structures 216. In addition, the body 212 has two light incident surfaces 2122, an upper surface 2124, two side surfaces 2126, and a lower surface 2128 (shown in FIG. 7). The positioning structure 214 is located on one of the side surfaces 2126, and the first micro-structures 216 are arranged in parallel on the upper surface 2124 except a first eliminating region 2124a. The structure and function of the light guide plate 210 are similar to those of the light guide plate 110, while the main difference of the light guide plate 210 from the light guide plate 110 is that in this embodiment, the fourth distance D41 is a distance from the second reference point P21 to the incident surface 2122, and the fifth distance D51 is a distance from the first reference point P11 to the incident surface 2122. In other words, the first eliminating region 2124a of this embodiment is a strip-shaped region. In the first eliminating region 2124a, the first micro-structures 116 are not arranged in a region between the first reference point P11 to the light incident surfaces 1122 and in a region between the second reference point P21 to the light incident surfaces 1122. It can be known that under the conditions of arranging the first eliminating region (i.e. the first distance D11 to the fifth distance D51), the invention does not intend to limit the shape of the first eliminating region.

Figure 7:
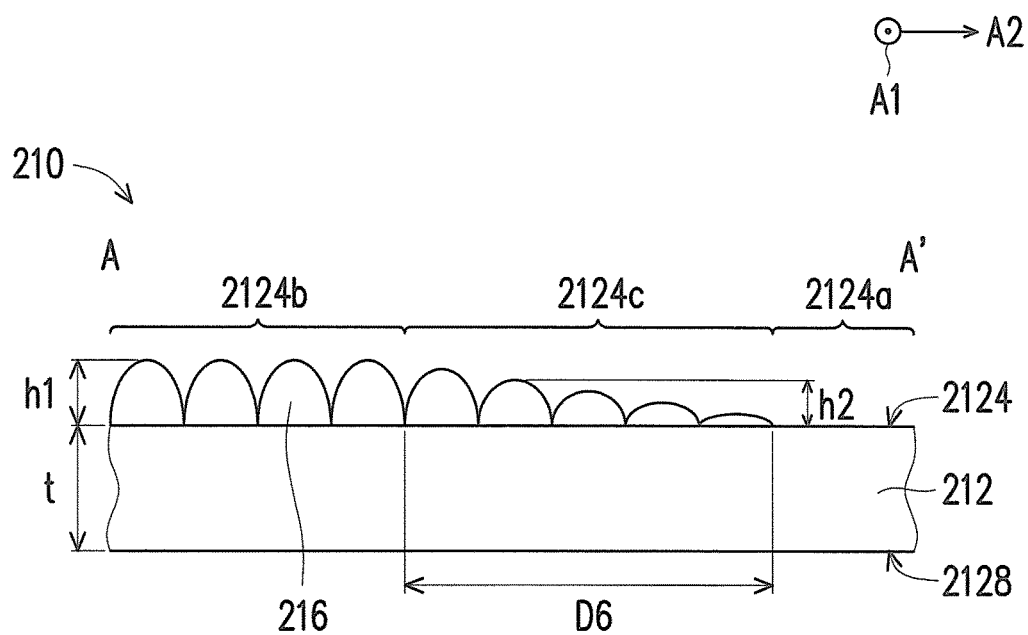
FIG. 7 is a cross-sectional schematic view of the light guide plate of FIG. 5 along an A-A' cross-sectional line.

FIG. 7 is a cross-sectional schematic view of the light guide plate of FIG. 5 along an A-A' cross-sectional line. Referring to FIGS. 5 and 7, in this embodiment, the upper surface 2124 of the body 212 has a first region 2124b and a second region 2124c located between the first region 2124b and the first eliminating region 2124a. The first micro-structures 216 are located on the first regions 2124b and second region 2124c, but not arranged on the first eliminating region 2124a. In this embodiment, there is a sixth distance D6 in the second axial direction A2 from a boundary between the second region 2124c and the first region 2124b to another boundary between the second region 2124c and the first eliminating region 2124a. In addition, the sixth distance D6 is between 5 mm and 50 mm. In other words, the sixth distance D6 may be considered as a width of the second region 2124c in the second axial direction A2. However, the invention does not intend to limit the size of the second region 2124c.

Furthermore, the body 212 has a consistent thickness t in this embodiment. The first micro-structures 216 in the first region 2124b have the same height, and heights of the first micro-structures 216 in the second region 2124c are lower than the heights of the first micro-structures 216 in the first region 2124b. In addition, the heights of the first micro-structures 216 in the second region 2124c gradually decrease in a direction toward the first eliminating region 216a. The height of the first micro-structure 216 refers to a distance between a top part of the first micro-structure 216 away from the upper surface 2124 to the corresponding part of the upper surface 2124. Since the second region 2124c in this embodiment is located between the first region 2124b and the first eliminating region 2124a and is closer to the first eliminating region 2124a than the first region 2124b is, the heights of the first micro-structures 216 in the second region 2124c gradually decreasing in the direction from the first region 2124b toward the first eliminating region 2124a may reduce a difference in height between the first micro-structures 216 and the first eliminating region 2124a. In addition, the first micro-structures 216 in the first region 2124b have a first height average h1, the first micro-structures 216 in the second region 2124c have a second height average h2, and a ratio between the second height average h2 and the first height average h1 is between 0.1 and 0.8. Thus, the difference in height between the first micro-structures 216 and the first eliminating region 2124a is not significant, which prevents the back light module 200 from producing bright and dark patterns with clear differences around the first eliminating region 2124a to affect the light emitting effect. However, the invention does not intend to limit the ratio between the second height average h2 and the first height average h1. The ratio may be adjusted based on the needs in practice.

Figure 8:
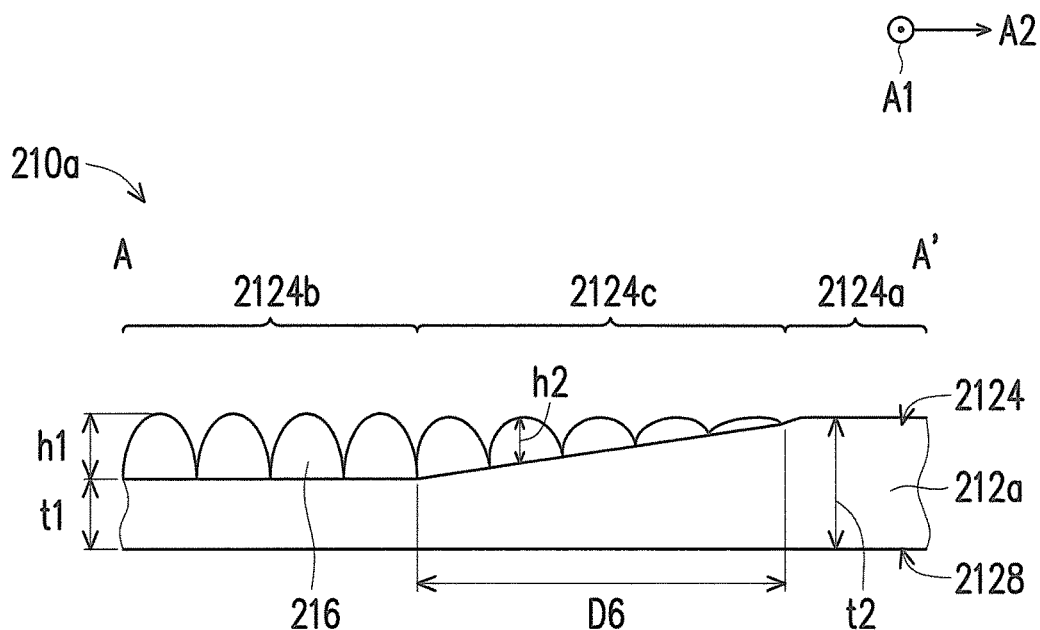
FIG. 8 is a partial cross-sectional schematic view illustrating a back light module according to still another embodiment of the invention.

FIG. 8 is a partial cross-sectional schematic view illustrating a back light module according to still another embodiment of the invention. Referring to FIGS. 5 and 8, in this embodiment, the structure and function of a light guide plate 210a are similar to those of the light guide plate 210 in FIG. 7. The light guide plate 210a mainly differs in that a body 212a of the light guide plate 210a does not have a fixed thickness. However, a top part of each of the first micro-structures 216 that is away from the upper surface 2124 is coplanar with a part of the upper surface corresponding to the first eliminating region 2124a. Specifically speaking, in this embodiment, the body 212a of the light guide plate 210a has a thickness t1 in the first region 2124b and a thickness t2 in the first eliminating region 2124a, the thickness t1 being smaller than the thickness t2. In addition, the thickness of the body 212a in the second region 2124c gradually increases in a direction from the first region 2124b toward the first eliminating region 2124a. In addition, in this embodiment, the first micro-structures 216 in the first region 2124b have the same height. The heights of the first micro-structures 216 in the second region 2124c are lower than the heights of the first micro-structures 216 in the first region 2124b, and gradually decrease in the direction toward the first eliminating region 2124a, such that the top part of each of the first micro-structures 216 that is away from the upper surface 2124 is coplanar with the part of the upper surface 2124 where the first eliminating region 2124a is located. With the configuration, even though the body 212a of this embodiment does not have a consistent thickness, and the heights of the first micro-structures 216 are also inconsistent, the light guide plate 210a has a consistent thickness. In addition, the design with the inconsistent heights of the first micro-structures 216 also may reduce the difference in height between the first micro-structures 216 and the first eliminating region 2124a, thereby preventing the back light module 200 from producing bright and dark patterns with clear differences around the first eliminating region 2124a. Besides, the second micro-structures (not shown) may also be arranged on the lower surface 2128 of the body 212 or 212a of the light guide plate 210 shown in FIGS. 5-7 and the light guide plate 210a shown in FIG. 8. The arrangement of the second micro-structures may be referred to the arrangement of the second micro-structures 118 distributed on the lower surface 1228 except the second eliminating region 1228a or distributed on the entire lower surface 1228. Therefore, no further details in this respect will be reiterated below.

Figure 9:
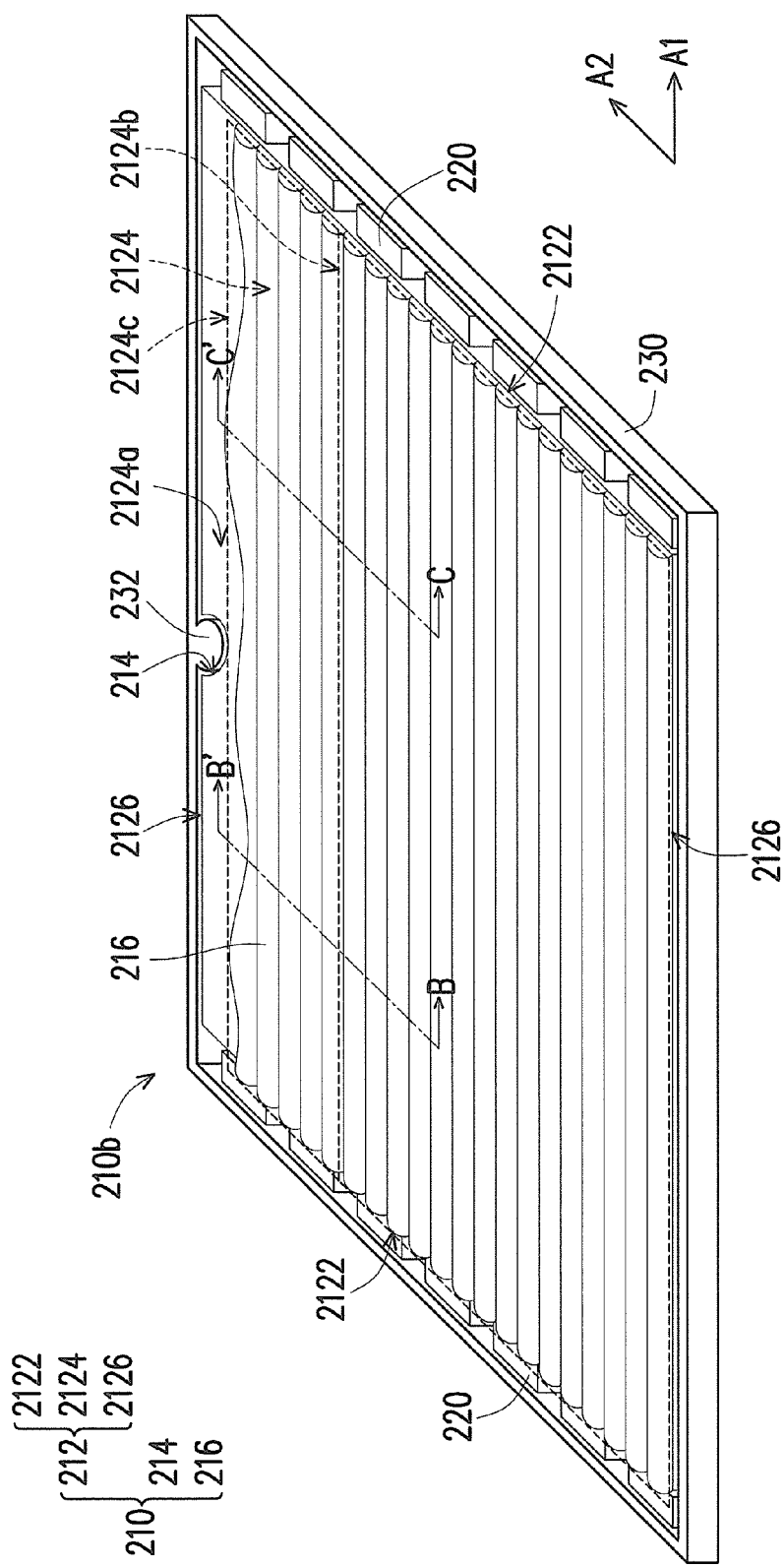
FIG. 9 is a schematic view illustrating a back light module according to yet another embodiment of the invention.
Figure 10:
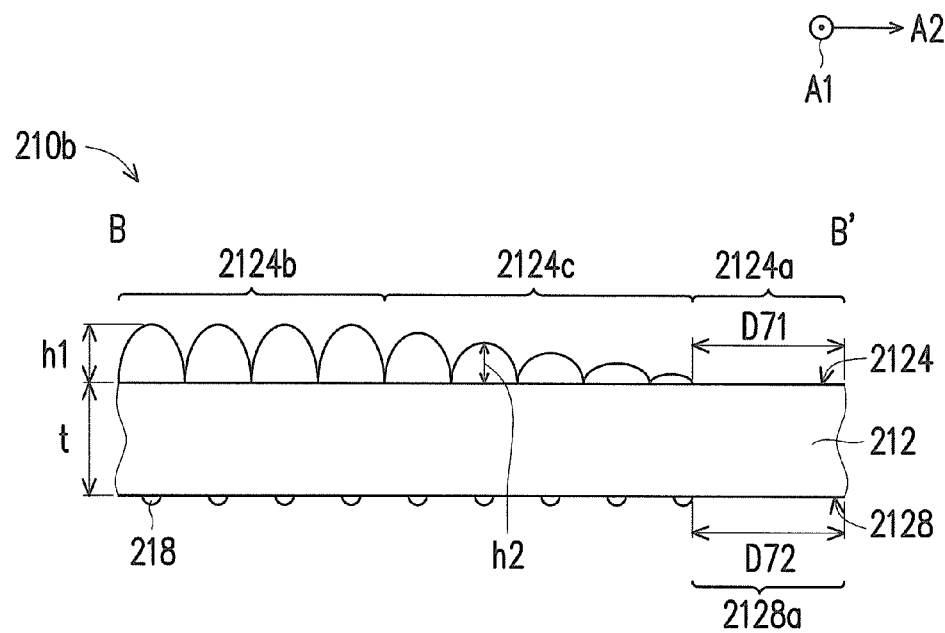
FIG. 10 is a cross-sectional schematic view of the light guide plate of FIG. 9 along a B-B' cross-sectional line.
Figure 11:
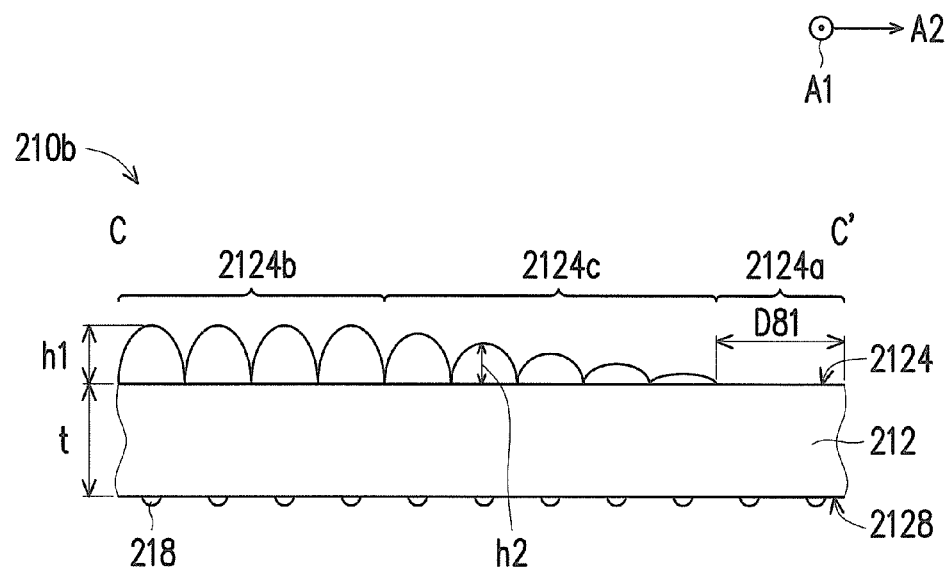
FIG. 11 is a cross-sectional schematic view of the light guide plate of FIG. 9 along a C-C' cross-sectional line.

FIG. 9 is a schematic view illustrating a back light module according to yet another embodiment of the invention. FIG. 10 is a cross-sectional schematic view of the light guide plate of FIG. 9 along a B-B' cross-sectional line. FIG. 11 is a cross-sectional schematic view of the light guide plate of FIG. 9 along a C-C' cross-sectional line. Referring to FIGS. 9-11, in this embodiment, a light guide plate 210b is similar to the light guide plate 210 shown in FIGS. 5-7. However, the light guide plate 210b mainly differs in that a boundary between the first eliminating region 2124a of the light guide plate 210 shown in FIG. 7 and the first micro-structures 216 is a straight line, while a boundary between the first eliminating region 2124a of the light guide plate 210b shown in FIG. 9 and the first micro-structures 216 is a wave-shaped curved line. The boundary between the first eliminating region 2124a and the first micro-structures 216 may be considered as a common boundary between the first eliminating region 2124a and the second region 2124c. In this embodiment, the common boundary between the first eliminating region 2124a and the second region 2124c of the light guide plate 210b is a wave-shaped curved line. The wave-shaped curved line has at least one wave trough and at least one wave peak, such as positions indicated by the B-B' cross-sectional line and C-C' cross-sectional line of the light guide plate 210b shown in FIG. 9. The wave-shaped curved line of the light guide plate 210b has a wave trough at the position indicated by the B-B' cross-sectional line of FIG. 9, and the wave-shaped curved line has a maximal distance D71 between the wave-shaped curved line and the side surface 2126 at the wave trough. On the contrary, the wave-shaped curved line of the light guide plate 210b has a wave peak at the C-C' cross-sectional line of FIG. 9, and the wave-shaped curved line has a minimal distance D81 between the wave-shaped curved line and the side surface 2126 at the wave peak. In this embodiment, a difference between the minimal distance D81 and the maximal distance D71 is between 1 mm to 40 mm. However, the invention is not limited thereto. In addition, in this embodiment, second micro-structures 218 are arranged on the lower surface 2128 of the body 212a. The second micro-structures 218 are located on the lower surface 2128 except the second eliminating region 2128a. In addition, a boundary between the second eliminating region 2128a and the second micro-structures 218 may also be a wave-shaped curved line as well. With the configuration, the wave-shaped curved line between the second eliminating region 2128 and the second micro-structures 218 has a maximal distance D72 at the wave trough, and has a minimal distance at the wave peak (not shown in FIG. 11). In addition, although the minimal distance of the second eliminating region 2128a on the C-C' cross-sectional line shown in FIG. 11 is zero, the invention is not limited thereto. In addition, since an area of the second eliminating region 2128a is smaller than an area of the first eliminating region 2124a in this embodiment, the maximal distance D72 of the second eliminating region 2128a is shorter than the maximal distance D71 of the first eliminating region 2124a, and the minimal distance of the second eliminating region 2128a is shorter than the minimal distance D81 of the first eliminating region 2124a. However, the invention is not limited thereto.

Based on the embodiments above, it can be known that the invention does not intend to limit the shapes of the first eliminating region on the upper surface and the second eliminating region on the lower surface. The first and second eliminating regions may be a ring-shaped region surrounding the positioning structure or a strip-shaped region connecting the light incident surfaces. In addition, the boundary between the first eliminating region and the first micro-structures and the boundary between the second eliminating region and the second micro-structures may be a straight line or a wave-shaped curved line. The designer may make an adjustment in this regard based on the needs in practice. In addition, the second eliminating region may be omitted from the lower surface, such that the second micro-structures are distributed on the entire lower surface. Furthermore, in the embodiments above, a cross-sectional profile of the first micro-structure on a plane parallel to the light incident surfaces (such as cross-sectional profiles of the first micro-structures 216 shown in FIGS. 7 and 8) is exemplified with a curved shape. However, in other embodiments, the cross-sectional profile of the first micro-structure may be in a semi-circular shape, a semi-elliptic shape, a parabola shape, a triangular shape or a rectangular shape, etc. The invention is not limited thereto. Thus, the embodiments above reduce the chance that light-jetting effect of the back light module occurs at the positioning structure by designing the first eliminating region. In this way, the back light module emits light evenly.

Figure 12:
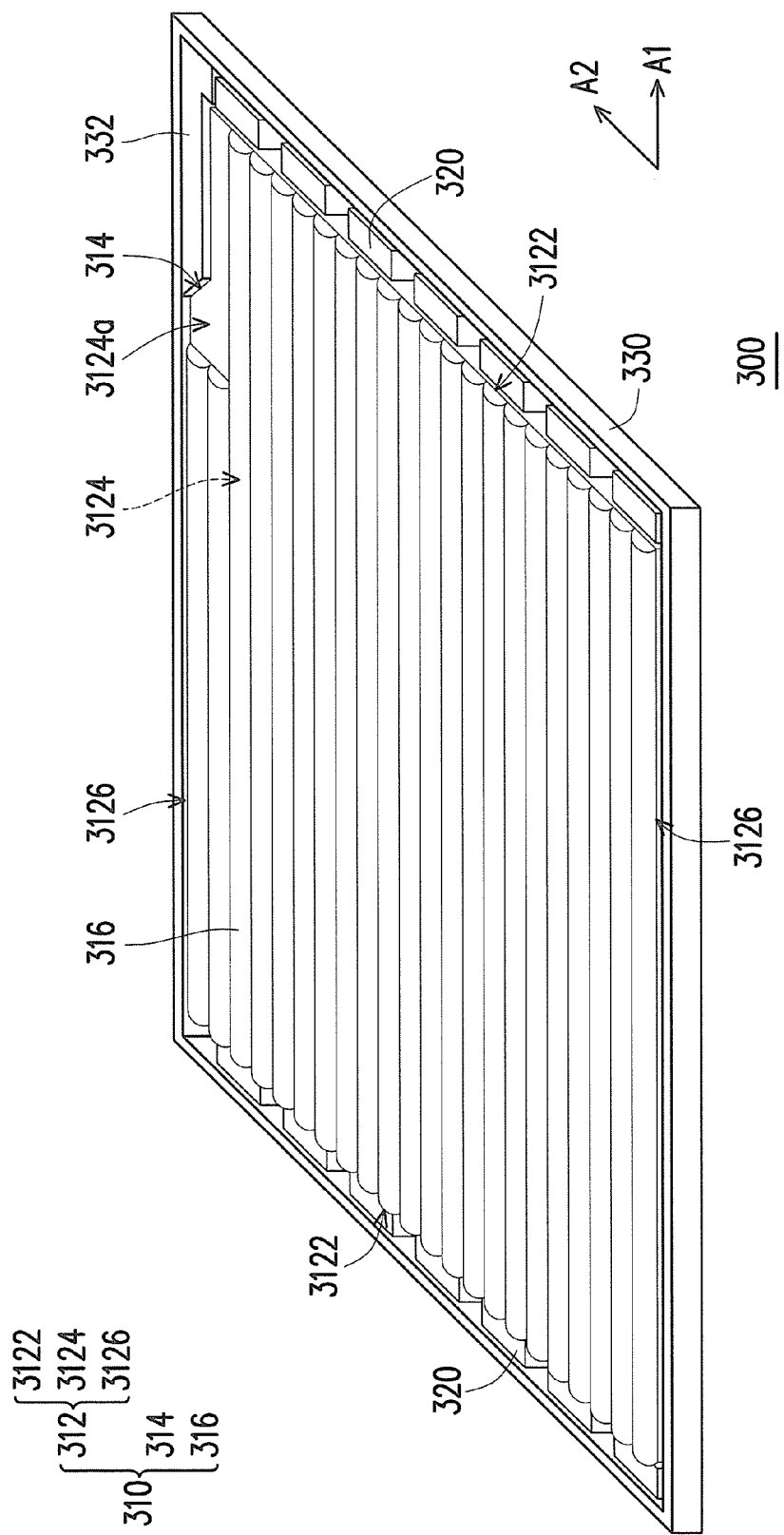
FIG. 12 is a schematic view illustrating a back light module according to another embodiment of the invention.
Figure 13:
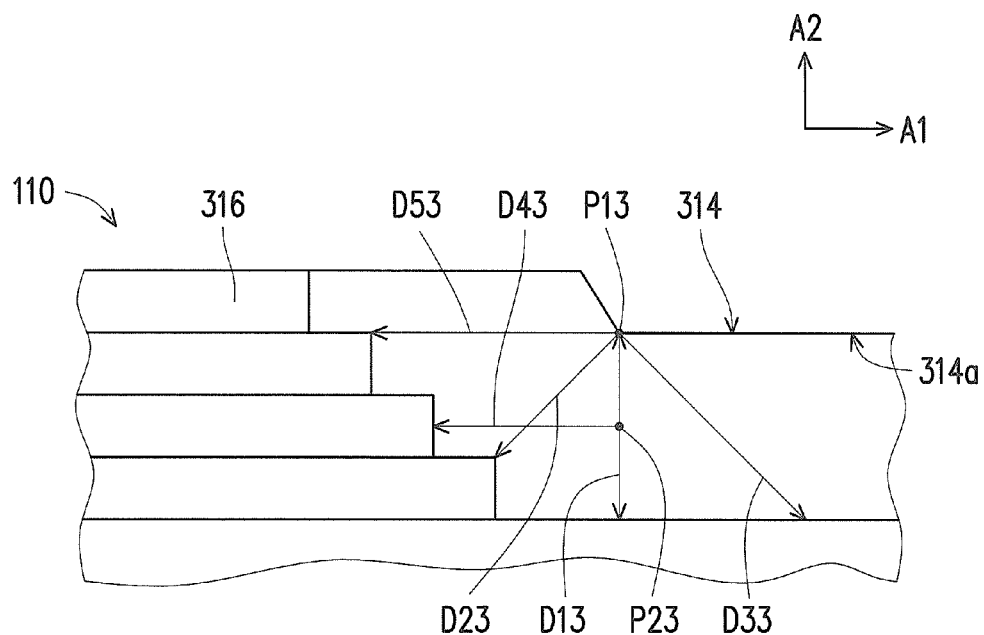
FIG. 13 is a partial schematic top view of the light guide plate of FIG. 12.

FIG. 12 is a schematic view illustrating a back light module according to another embodiment of the invention. FIG. 13 is a partial schematic top view of the light guide plate of FIG. 12. Referring to FIGS. 12 and 13, in this embodiment, a back light module 300 includes a light guide plate 310, a plurality of point light sources 320, and a frame 330. The structures and functions of the point light sources 320 and the frame 330 may be referred to the point light sources 120 and the frame 130. Therefore, no further details in this respect will be described below. The light guide plate 310 includes a body 312, a positioning structure 314, and a plurality of first micro-structures 316. In addition, the body 312 has two light incident surfaces 3122, an upper surface 3124, two side surfaces 3126, and a lower surface (not shown). The structure and function of the light guide plate 310 are similar to those of the light guide plate 110. However, the light guide plate 310 mainly differs in that the positioning structure 314 is located on one of the side surfaces 3126 and adjacent to one of the light incident surfaces 3122. In other words, the positioning structure 314 is located at a corner of the body 312. In this embodiment, the positioning structure 314 is a positioning recess part, for example, and a positioning component of the frame 330 is a positioning block corresponding to the positioning recess part being used as the positioning structure 314. The positioning block being used as the positioning component 332 is located between a sidewall of the frame 330 and the side surface 3126, and extends to a position between another sidewall of the frame 330 and the light incident surface 3122, so as to prevent the light guide plate 310 or the point light sources 320 from hitting the frame 330 due to shaking of the back light module 300.

Similarly, in this embodiment, the upper surface 3124 of the body 312 has a first eliminating region 3124a, and the first eliminating region 3124a is adjacent to and surrounds the positioning structure 314. In addition, the first micro-structures 316 are arranged in parallel on the upper surface 3124 except the first eliminating region 3124a. The first eliminating region 3124a is defined in a way similar to the definition of the first eliminating region 1124a. For example, in this embodiment, there is an edge 314a between the positioning recess part being used as the positioning structure 314 and the first eliminating region 3124a, and the edge 314a is a polygonal line formed by a horizontal line parallel to the first axial direction A1 and an oblique line relative to the horizontal line. The edge 314a has a first reference point P13. The first reference point P13 is a break point of the edge 314a, and a distance from the first reference point P13 to a plane where the side surface 3126 is located is longer than a distance from other parts of the edge 314a to the plane. In addition, the first eliminating region 3124a has a second reference point P23 at a position that is 5 mm before the adjacent first micro-structure 316 in the second axial direction A2 from the first reference point P13. Accordingly, the first eliminating region 3124a of this embodiment may be defined in accordance with the definition of the first eliminating region 1124a. Namely, a first distance D13, a second distance D23, a third distance D33, a fourth distance D43 and a fifth distance D53 are defined, and conditions of the first distance D13, the second distance D23, the third distance D33, the fourth distance D43, and the fifth distance D53 may be referred to those of the first distance D11, the second distance D21, the third distance D31, the fourth distance D41, and the fifth distance D51. Therefore, no further details in this respect will be reiterated below. Thus, the first eliminating region 3124a has an appropriate size in a plurality of directions to surround the positioning structure 314, so as to keep an appropriate distance between the positioning structure 314 and the first micro-structures 316. In addition, in this embodiment, the lower surface of the body 312 may be arranged with the second micro-structures (not shown). The second micro-structures may be arranged on the entire lower surface or on the lower surface except the second eliminating region. Besides, the second eliminating region is smaller than the first eliminating region 3124a. Description in this respect may be referred to the description about the second micro-structures 118 and the second eliminating region 1128a. Accordingly, the chance that light-jetting effect of the back light module 300 occurs at the positioning structure 314 in this embodiment may be reduced.

Figure 14:
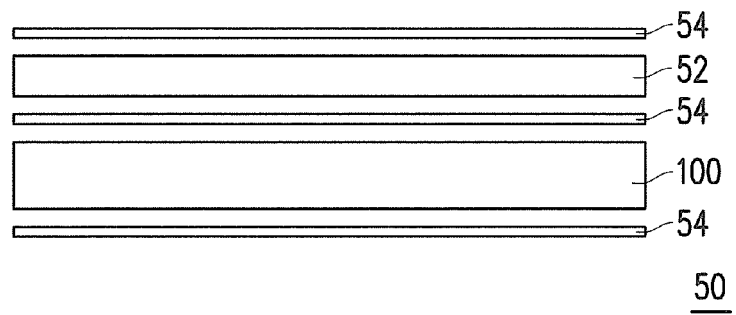
FIG. 14 is an exploded schematic side view illustrating a display device according to an embodiment of the invention.
Figure 15:
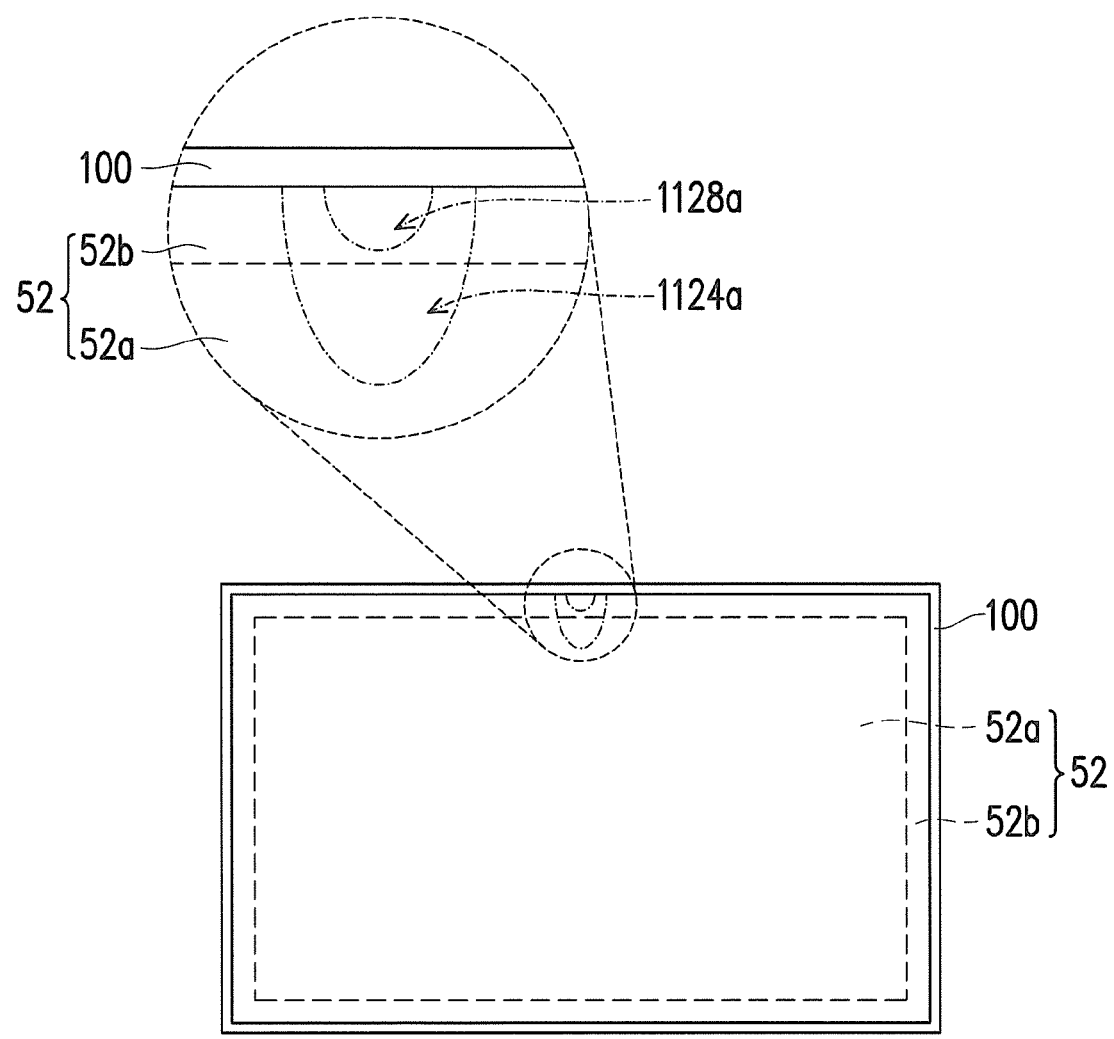
FIG. 15 is a schematic top view of the display device of FIG. 14.

FIG. 14 is an exploded schematic side view illustrating a display device according to an embodiment of the invention. FIG. 15 is a schematic top view of the display device of FIG. 14. Referring to FIGS. 1, 2, 14 and 15, in this embodiment, a display device 50 includes the back light module 100 aforementioned and a display panel 52. The display panel 52 is, for example, a liquid crystal display panel or other suitable display panels. The invention does not intend to limit the types of the display panel 52. The display panel 52 is arranged on the back light module 100 and faces the upper surface 1124. In this way, the light emitted from the point light sources 120 of the back light module 100 is guided by the light guide plate 110 to be emitted from the upper surface 1124 and pass through the display panel 52, so as to allow the display device 50 to display an image. Specifically, the display panel 52 has a display region 52a and a non-display region 52b surrounding the display region 52a. The display region 52a corresponds to a component (e.g. the pixel structure) configured to display an image in the display panel 52, while the non-display region 52b corresponds to a component (e.g. wiring at the periphery) that influences a visual effect in the display panel 52. Therefore, when the display panel 52, the back light module 100, and other suitable components are assembled to form the display device 50, such as being assembled to an assembling frame not shown herein, the display region 52a may be used to display an image. At this time, the first eliminating region 1124a and the second eliminating region 1128a of the back light module 100 correspond to the periphery of the display panel 52, as indicated by the broken line in FIG. 15 (FIG. 15 omits the first micro-structures 116 of FIG. 2 and the second micro-structures 118 of FIG. 4A).

In this embodiment, an area of an orthogonal projection region of the first eliminating region 1124a on the non-display region 52b is smaller than an area of an orthogonal projection region of the first eliminating region 1124a on the display region 52a, and the second eliminating region 1128a is in the non-display region 52b. Specifically, a large portion of the first eliminating region 1124a is located in the display region 52a, while a small portion of the first eliminating region 1124a is located in the non-display region 52b. Accordingly, the first eliminating region 1124a may reduce light-jetting effect of the back light module 100. In addition, since the second micro-structures 118 (shown in FIG. 4A) is configured to guide the light to the upper surface 1124, whether the second micro-structures 118 are configured in a part influences a light-emitting outcome of the back light module 110 at the part. Thus, the second eliminating region 1128a is preferably located in the non-display region 52b, such that the second micro-structures 118 at least correspond to the entire display region 52a, so as to ensure the light emitted by the back light module 100 enters the entire display region 52a and there is no significant difference in brightness at an interface between the display region 52a and the non-display region 52b. Hence, it can be known that the light generated by the back light module 110 has an even light-emitting effect in the entire display region 52a. Moreover, the display device 50 further includes a plurality of optical films 54. The optical films 54 are arranged between the light guide plate 110 and the frame 130 (shown in FIG. 1) of the back light module 100, between the light guide plate 110 and the display panel 52, or on the display panel 52. In addition, the optical films 54 may be a diffusion film, a prism film, a polarizing film, a brightness-enhanced film, or a reflection film, etc. In other words, the designer may choose the type and position of the optical films 54 for the display device 50 or choose to not arrange the optical films 54 based on the needs in practice. The invention is not limited thereto. In addition, the back light modules 200 and 300 aforementioned are also applicable in the display device 50 of FIGS. 14 and 15. The invention is not limited thereto. Thus, the defect of mura of the display device 50 due to light jetting effect of the back light module 100, 200, or 300 occurred at the positioning structure may be prevented. As a result, the display device 50 of this embodiment has an even display effect.

In view of the foregoing, the back light module provided in the invention has the first micro-structures and the first eliminating region arranged on the upper surface of the body. In addition, the first eliminating region is adjacent to and surrounds the positioning structure located on the side surface of the body, and the first micro-structures are arranged on the upper surface except the first eliminating region. Moreover, the second micro-structures are arranged on the lower surface of the body. The second micro-structures are arranged on the lower surface except the second eliminating region or the entire lower surface. In addition, the second micro-structures are different from the first micro-structures, and the second eliminating region is smaller than the first eliminating region. Thus, when the light guide plate is used with the point light sources and guides the light to be emitted from the upper surface by using the first and second micro-structures, the first eliminating region eliminates light-jetting effect around the positioning structure. Also, the display device that uses the back light module avoids the defect of mura due to light jetting effect of the back light module at the positioning structure. Accordingly, the back light module of the invention has an even light-emitting effect, and the display device provided in the invention has an even display effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A back light module, comprising:
    a light guide plate, comprising:
        a body, having at least one light incident surface, an upper surface, a lower surface and at least one side surface, wherein the light incident surface is connected to the upper surface, and the side surface is connected to the light incident surface and the upper surface, the lower surface is opposite to the upper surface and connected to the light incident surface at the side surface;
        a positioning structure, located at the side surface, wherein the upper surface has a first eliminating region, and the lower surface has a second eliminating region, the first eliminating region and the second eliminating region is adjacent to and surrounding the positioning structure, wherein an area of the second eliminating region is smaller than an area of the first eliminating region, and an orthogonal projection of the second eliminating region on the body is located within an orthogonal projection of the first eliminating region on the body; and
        a plurality of first micro-structures, extending along a first axial direction and arranged in parallel on the upper surface except the first eliminating region;
        a plurality of second micro-structures, arranged on the lower surface except on the second eliminating region;
    a plurality of point light sources, arranged at one side of the light guide plate and facing the light incident surface, wherein the point light sources are adapted to emit light toward the light guide plate, and the light emitted by the point light sources enters the light guide plate from the light incident surface to be emitted from the upper surface; and
    a frame, wherein the light guide plate is arranged on the frame, the frame has a positioning component, and the light guide plate is positioned in the frame by matching the positioning structure with the positioning component.

2. The back light module as claimed in claim 1, wherein the first micro-structures comprise a plurality of strip-shaped micro-structures extending along the first axial direction, the first axial direction being perpendicular to the light incident surface, and the second micro-structures comprise a plurality of point-shaped micro-structures distributed on the lower surface.

3. The back light module as claimed in claim 2, wherein the second micro-structures are arranged on the entire lower surface.

4. The back light module as claimed in claim 2, wherein the positioning structure comprises a positioning recess part located on the side surface and penetrating through the upper surface and the lower surface.

5. The back light module as claimed in claim 4, wherein there is an edge between the positioning recess part and the first eliminating region, the edge has a first reference point being the center point or a break point of the edge, and a distance from the first reference point to a plane where the side surface is located is longer than a distance from other parts of the edge to the plane.

6. The back light module as claimed in claim 5, wherein the first eliminating region has a first distance from the first reference point to the adjacent first micro-structure along an axial direction perpendicular to the first axial direction, and the first distance is between 10 mm and 50 mm.

7. The back light module as claimed in claim 5, wherein the first eliminating region has a second distance and a third distance respectively from the first reference point to the adjacent first micro-structure along two axial directions having an included angle of 45 degrees with respect to the first axial direction, and the second distance and the third distance are respectively between 14 mm and 70 mm.

8. The back light module as claimed in claim 5, wherein the first eliminating region has a second reference point at a position that is 5 mm before the adjacent first micro-structure in an axial direction perpendicular to the first axial direction from the first reference point, and the first eliminating region has a fourth distance from the second reference point to the adjacent first micro-structure along the first axial direction, the fourth distance being at least 1 mm.

9. The back light module as claimed in claim 5, wherein the first eliminating region has a fifth distance from the first reference point to the adjacent first micro-structure along the first axial direction, and the fifth-distance is at least 5 mm.

10. The back light module as claimed in claim 1, wherein the upper surface has a first region and a second region between the first region and the first eliminating region, the first micro-structures in the first region have the same height, heights of the first micro-structures in the second region are lower than the heights of the first micro-structures in the first region, and gradually decrease in a direction toward the first eliminating region.

11. The back light module as claimed in claim 10, wherein a top part of each of the first micro-structures away from the upper surface is coplanar with a part of the upper surface corresponding to the first eliminating region.

12. The back light module as claimed in claim 10, wherein there is a sixth distance from a boundary between the second region and the first region to another boundary between the second region and the first eliminating region in an axial direction perpendicular to the first axial direction, and the sixth distance is between 5 mm and 50 mm.

13. The back light module as claimed in claim 10, wherein the first micro-structures in the first region have a first height average, and the first micro-structures in the second region have a second height average, and a ratio between the second height average and the first height average is between 0.1 and 0.8.

14. The back light module as claimed in claim 1, wherein a boundary between the first eliminating region and the first micro-structures is a wave-shaped curved line having at least one wave peak and at least one wave trough, and the wave-shaped curved line has a minimal distance at the wave peak relative to the side surface and a maximal distance at the wave trough relative to the side surface, a difference between the minimal distance and the maximal distance ranging between 1 mm and 40 mm.

* * * * *